United States Patent Office 3,661,880
Patented May 9, 1972

3,661,880
PROCESS FOR PREPARING SOLID WATER-SOLUBLE CATIONIC POLYMERS
Gerhard Markert, Ober Ramstadt-Eiche, Horst Pennewis and Klaus Ross, Darmstadt, and Dieter Neher, Darmstadt-Eberstadt, Germany, assignors to Rohm Gesellschaft mit beschrankter Haftung, Darmstadt, Germany
No Drawing. Filed May 28, 1969, Ser. No. 828,722
Claims priority, application Germany, June 7, 1968,
P 17 70 588.3
Int. Cl. C08f 3/62, 3/90
U.S. Cl. 260—89.5 N                                   1 Claim

ABSTRACT OF THE DISCLOSURE

An improved method for preparing solid water-soluble cationic polymers by polymerizing concentrated aqueous monomer solutions in thin horizontal layers bounded by flexible walls, and then concentrating the resulting polymer solutions by evaporating water directly therefrom to form non-adherent solids easily separable from said walls.

---

The present invention invention relates to a process for preparing solid water-solid cationic polymers.

Water-soluble cationic polymers are widely employed in practice as auxiliary agents in the paper and textile industries; as binders, adhesives, and sizes; as hairdressing agents; for rendering fibers and films anti-static; as dyeing auxiliaries; as dispersing and emulsifying agents for pigments, oils, and the like; as bactericides; as thickening agents for aqueous solutions; and as flocking and sedimentation agents. Polymers of acrylic esters and methacrylic esters which have a quaternary ammonium group in the alcohol portion thereof are particularly useful for the above-mentioned purposes. In many cases, the polymers show a greater activity the higher their molecular weight. However, the technical preparation of very high molecular weight polyacrylic acid esters and polymethacrylic acid esters having quaternary groups in the alcohol portion thereof entails considerable difficulties.

It is know from the chemistry of high polymers that very high molecular weight products are obtained only under certain definite conditions: (1) the polymerization must take place at the highest possible concentration, (2) in a very weak stream of free radicals, and (3) in the absence of chain transfer agents. The monomeric acrylic acid esters and methacrylic acid esters with quaternary ammonium groups are not fusible and can only be polymerized in aqueous solution. This places an upper limit on the concentrations which can be used. Chain-terminating agents can be excluded relatively easily. However, the remaining requirement, namely that the lowest possible free radical stream should be employed—that is, that one should work with a small number of newly-formed starting free radicals, per unit time and per unit volume of the polymerizing mixture—can only be satisfied by striking a compromise with the polymerization time required. One is therefore forced to polymerize at the highest possible concentration and with a polymerization time which is just still economical.

Numerous processes of this type have been described, for example in German patent publication 1,070,828. The concentrated polymer solution obtained, which is as a rule not fluid at concentrations of more than thirty weight percent, is diluted with water or with mixtures of water and appropriate organic solvents to such an extent that a product having good flow properties is obtained. The polymers are marketed commercially in this form. Until now, however, a technically feasible process for obtaining such a polymer in finely-divided solid form has been lacking.

Products like this are nevertheless desired as solids because of their lower transport costs and their smaller need for storage space.

It has already been proposed in German patent publication 1,032,922 to polymerize 25- to 50-percent solutions of water-soluble monomers in thin films on a heated roll or band, simultaneously removing the water by evaporation, and then to peel the polymer off with a knife. Although the production of solid high molecular weight polyacrylic esters or polymethacrylic esters of quaternary amino alcohols in this fashion may be possible, the process cannot be seriously contemplated for economic reasons. Because of the long polymerization times which are necessary, a suitable machine—even at low production rates—would have to be of considerable size and moreover would have to operate in an oxygen-free atmosphere.

Belgian patent publication 694,342 describes a process according to which water-soluble polymers are produced in solid form by polymerizing at least 30-percent aqueous solution of a monomer in a film bag or in a flat rigid-walled vessel and then removing the gel-like solid polymer solution so obtained from the bag or polymerization vessel, drying it, and breaking it up. However, the method as described in the patent proves unworkable when applied to the polymerization of methacryloxy-ethyl-trimethyl ammonium-chloride. The gel-like polymer solution adheres so tenaciously to container walls of whatever kind that the polymerization container can only be opened by destroying it and in no case can be separated from the polymer.

The surprising observation has now been made that the great adhesive power of the aqueous polymer gel, which still cannot be overcome at a water content of about 30 percent, disappears if the water content is reduced to about 10 percent. At this water content, the polymer is rigid and more brittle and can be removed from a film or a flexible substrate with ease and ground to a powder. This observation lies at the heart of the present invention described below.

The process of the invention relates to the preparation of solid water-soluble cationic polymers by the polymerization, in the presence of a water-soluble free-radical forming initiator, of a compound of the general formula

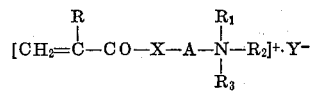

wherein R is hydrogen or lower alkyl, X is —O— or —NH—, A is a linear or branched alkylene radical having 2 to 8 carbon atoms, $R_1$, $R_2$, and $R_3$ are the same or different lower alkyl, carbamoyl methyl, benzyl, or hydroxyalkyl radicals, and Y is an acid anion, alone or together with minor amounts of further monomers. A concentrated aqueous solution of the monomers is polymerized in a thin film, with evaporation of the polymer solution obtained. According to the invention, the polymerization is carried out in a flexible-walled vessel, open at the top, wherein the polymerizing mixture forms a horizontal surface. It is carried out with exclusion of atmospheric oxygen, and the concentrated polymer solution is directly evaporated in the polymerization vessel to a polymer content of at least 85 percent.

The thickness of the layer of the monomer solution employed should be limited so that the heat of polymerization can be removed to a large extent. A layer thickness of 10 centimeters is a limit up to which a uniform polymer of high molecular weight can still be obtained at relatively low monomer concentration and with a very slow polymerization, for example using a redox system. In order to utilize the advantages of particularly high molecular weights to the fullest, layer thicknesses of 5 centimeters should not be exceeded. Taking the economy of the process also into consideration, the best results are attained with a layer thickness of from 1 to 3 centimeters. The process can be carried out technically at still smaller thicknesses, but no longer so economically. If a layer thickness of about 5 centimeters is not exceeded, cooling apparatus can be dispensed with: heat loss through the gas phase suffices. In order to avoid the entry of oxygen into the polymerization chamber, polymerization suitably takes place in a chamber closed to the atmosphere under a slight excess pressure of an inert gas such as nitrogen, carbon dioxide, or argon.

The polymerization vessel to be used in practicing the present invention should be formed so that the polymerizing mixture can form the largest possible free surface. Sheet metal with flanged edges and shallow pans or troughs are suitable, for example. Vessels which per se are rigid but which are lined with a flexible film are used with particular advantage. The film can be a metal foil, such as of aluminum, copper, or lead, or may be of plastic, such as of a polyolefin, polyester, polyvinyl chloride, or polytetrafluoroethylene. Tarred or oiled paper can be used if the melting point of the impregnating substance is not exceeding during polymerization and subsequent drying. Self-supporting vessels of a sufficiently flexible material, such as of polyethylene or polypropylene, can be employed provided that they have walls sufficiently thin that they can be splayed from the polymer at every point of contact. In industrial use, shallow pans of sheet metal having upwardly flanged edges and lined with a polyester film are most suitable. A plurality of such sheet metal pans, filled with the mixture to be polymerized, can be introduced at the same time into a warming oven capable of being evacuated, preferably one having a gas-circulating apparatus.

Methacryloxyethyl - trimethyl - ammonium - chloride, -methosulfate, and -acetate; 2-methacryloxypropyl-dimethyl-benzyl-ammonium-chloride; and acrylamidoethyl-diethyl-methyl-ammonium-p-toluene sulfonate can be mentioned as examples of the monomers which can be polymerized according to the present invention. In addition to monomers of this type, which are polymerized alone or at least in a major proportion, further monomers can be employed in minor proportion according to the properties required in the end product. If water-soluble monomers such as acrylamide, methacrylamide, or N-vinyl pyrrolidone are employed, the amount in which they are present is determined only by the properties desired in the end product and can be, for example, up to 40 percent by weight of the monomer mixture. Water-insoluble monomers, such as lower acrylic acid esters or methacrylic acid esters, acrylonitrile, vinyl acetate, or styrene, can be employed only in amounts which are solubilized by the presence of the water-soluble monomer or monomer mixture. For example, they can comprise up to about 10 percent by weight of the monomer mixture, particularly if surface-active compounds are additionally present further to improve solubility.

If value is placed on having an extremely high molecular weight, the monomers are polymerized in the most concentrated aqueous solution possible. The concentration region between about 40 percent and about 75 percent has proved particularly useful.

The polymerization temperature and polymerization times involved are closely dependent on the initiator system chosen. Water-soluble free-radical forming initiators whose decomposition temperature is below 100° C. are suitable for the process of the invention. Initiators decomposing at higher temperatures can be employed if the polymerization is carried out under pressure. α,α'-azo diisobutyramidine-dihydrochloride or 4,4'-azo bis-4,4'-dicyanovalerianic acid are, for example, suitable organic initiators. The last-mentioned initiator initiates polymerization at 50° C.–60° C. According to the layer thickness and the facilities for heat removal, the temperature within the polymerizing mixture climbs to 80° C.–100° C.

Redox initiator systems permit lower temperatures. With the system ammonium peroxydisulfate/sodium pyrosulfite, polymerization begins at room temperature, whereupon warming to 40° C.–50° C. follows. Other redox systems such as hydrogen peroxide/iron salts or persulfate/rongalite behave similarly, but the highest molecular weights are reached with the first-mentioned system. If high molecular weights are sought, the amount of initiator should be only so large that complete polymerization of the monomers is assured. The amount required to accomplish this is between 0.02 and 0.05 weight percent, calculated upon the monomers, for most of the initiator systems. Every excess of initiator lowers the molecular weight.

In order to carry out batch polymerizations in a reproducible manner, a complexing agent for metal ions, for example the sodium salt of ethylene diamine tetraacetic acid or a sodium phosphate, is suitably added. The disturbing influence of traces of heavy metals is eliminated in this manner.

It is recommended that the reaction mixture be evaporated directly after polymerization. To do this, the polymerization mixture, which at this stage is extremely tough and sticky, is kept in the polymerization container, advantageously in the same warming oven. At atmospheric pressure, for an average layer thickness, and a temperature of about 110° C., a residual moisture content of about 10 weight percent is reached after six to eight hours. Under otherwise equal conditions, a drying time of 4 to 5 hours is sufficient when drying in a vacuum, for example of 100 mm. Hg, and vacuum drying offers the advantage that bubbles are formed in the mass, which then can be more easily broken up. The mixture when dried to a water content of about 10 percent is hard and brittle, and is no longer adhesive. The film used to line the polymerization vessel can easily be removed without leaving any adhering residue. In the same manner, a self-supporting flexible vessel can be easily separated from the polymer, beginning at an edge. The polymer can then be ground to any desired particle size. Further drying is difficult to achieve and has no additional advantage.

The ground polymer is easily soluble in water. A 1 percent aqueous solutions has a viscosity of at least 1500 centipoises, at least if measures for the achievement of a very high molecular weight product are at least partially observed. Higher viscosities, for example from 3000 up to 6000 centipoises, can be reached in solutions of the same concentration.

The polymers obtained according to the invention are suitable for the uses mentioned earlier. It has been found that the extremely high molecular weight polymers of the present invention offer unexpectedly great advantages over similar—but lower molecular weight—products of the prior art when used as flocculants and as retention agents in the production of paper. Also, surprisingly, the polymers in the form of their chlorides are found to be considerably more effective than the corresponding sulfates, methosulfates, or the like. The polymers are further suitable as thickening agents for non-aqueous water-soluble organic solvents, particularly for the lower alcohols. The viscosity of a solvent mixture comprising equal parts of isopropyl alcohol and dipropylene glycol can be raised with an extremely high molecular weight polymethacryloxyethyl-trimethyl-ammonium chloride more effectively than with any other known thickening agent. Water-free solutions of this kind are very valuable for uses in liquid washing and cleaning agents, and in cosmetics. When employed as anti-static coatings on fibers and plastics, the high molecular weight products of the present invention exhibit improved wash-resistance.

A better understanding of the present invention and of its many advantages can be had by reference to the following examples, given by way of illustration, in which the preparation of several extremely high molecular weight polymers particularly suitable in the aforementioned fields of use is described.

EXAMPLE 1

100 grams of β - methacryloxyethyl - benzyl - dimethyl ammonium chloride were dissolved in 43 grams of a solvent mixture of water and acetone (77:23). The solution was combined with 0.013 gram of the sodium salt of ethylene diamine tetraacetic acid and with 0.033 gram of 4,4' - azobis - 4,4' - dicyano - valerianic acid. Shallow aluminum troughs lined with polyethylene terephthalate film served as the polymerization vessels. The monomer solution was introduced therein to a depth of three centimeters. The polymerization was carried out in a warming oven under a carbon dioxide atmosphere at 55°–60° C. After 3 to 4 hours, the temperature climbed to 90°–100° C. As soon as the temperature sank, the mixture was heated to 110° C. and the warming oven was ventilated. After 7 hours, the reaction product was glassy and brittle. It was removed from the aluminum troughs together with the film. The latter was removed from the polymer and the polymer was ground to a powder. The ground powder is highly water-soluble and a 1 percent solution has a viscosity of 2000 to 4000 centipoises.

If drying at 100° C. is carried out in a vacuum of 100 mm. Hg, rather than under atmospheric pressure, the product is sufficiently dry after 4 to 5 hours.

EXAMPLES 2–4

The procedure of Example 1 was repeated using, instead of the monomer there described, the same amount of each of the following compounds:

Example 2: β-methacryloxyethyl-acetamido-dimethyl-ammonium chloride.

Example 3: β-acryloxyethyl-trimethyl-ammonium-chloride.

Example 4: β-methacryloxyethyl-diethyl-methyl-ammonium-chloride.

A 1 percent aqueous solution of the products obtained had a viscosity of from 2000 to 4000 centipoises.

EXAMPLE 5

100 grams of β - methacryloxyethyl - trimethyl - ammonium-chloride were dissolved in a mixture of 33 grams of water and 10 grams of acetone. The solution was combined with a redox accelerator system comprising 0.027 gram of ammonium peroxydisulfate and 0.017 gram of sodium pyrosulfite, as well as with 0.013 gram of the sodium salt of ethylene diamino tetraacetic acid. The polymerization was carried out as in Example 1 employing shallow aluminum troughs lined with polyethylene terephthalate films, however, polymerization began at 20° C.–25° C. After an induction period of 1 to 5 hours, the temperature rose to 35° C.–45° C. Thereafter, the material was dried for four to five hours at 110° C. and at 100 mm. Hg. The dried product was separated from the film and ground. A 1 percent aqueous solution thereof had a viscosity of 3000 to 6000 centipoises.

What is claimed is:

1. In a method for the preparation of a solid water-soluble cationic polymer by polymerizing, in the presence of a water-soluble free-radical forming initiator and with the exclusion of atmospheric oxygen, a compound of the formula

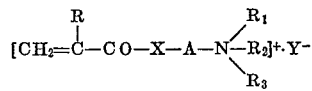

wherein R is hydrogen or lower alkyl; X is —O— or —NH—; A is a linear or branched alkylene radical having 2 to 8 carbon atoms; $R_1$, $R_2$, and $R_3$ are the same or different lower alkyl, carbamoyl methyl, benzyl, or lower hydroxyalkyl groups; and Y is an acid anion; alone or togther with up to 40 percent of further ethylenically unsaturated monomers, in a thin layer of a concentrated aqueous solution thereof, and then concentrating the polymer solution so obtained by evaporating water therefrom, the improvement wherein: (1) said compound is polymerized in a thin horizontal layer up to 5 centimeters thick, unbounded at the top and bounded at the bottom and sides by flexible walls; (2) the polymer solution so obtained is concentrated to a polymer content of at least 85 percent by evaporation of water therefrom while in contact with said walls; and (3) the solid material thus obtained is then separated from the walls containing it.

References Cited

UNITED STATES PATENTS 2,980,657    4/1961    Melamed _____ 260—86.1
3,328,499    6/1967    Barnette _____ 264—108

OTHER REFERENCES

Derwent: Belgian Patents Report (December 1966 to March 1967), (Belg. Pat. 694,342), p. 2.

JOSEPH L. SCHOFER, Primary Examiner

C. A. HENDERSON, Jr., Assistant Examiner

U.S. Cl. X.R.

203—14; 260—79.3 MU, 80 M, 85.5 AM, 85.7, 86.1 N, 88.1 PM, 89.7 N, DIG 18